(12) United States Patent  (10) Patent No.: US 8,445,784 B2
Chesnais et al.  (45) Date of Patent: May 21, 2013

(54) PROTECTIVE DEVICE, PARTICULARLY FOR CONNECTION ELEMENT

(75) Inventors: Jean-Rene Chesnais, Crepy en Valois (FR); Yann Batique, Crepy en Valois (FR); Jean Ferrand, Crepy en Valois (FR)

(73) Assignee: Federal Mogul Systems Protection, Crepy en Valois (FR)

( * ) Notice: Subject to any disclaimer, the term of this patent is extended or adjusted under 35 U.S.C. 154(b) by 319 days.

(21) Appl. No.: 12/933,773

(22) PCT Filed: Mar. 25, 2009

(86) PCT No.: PCT/FR2009/000326
§ 371 (c)(1),
(2), (4) Date: Sep. 21, 2010

(87) PCT Pub. No.: WO2009/130403
PCT Pub. Date: Oct. 29, 2009

(65) Prior Publication Data
US 2011/0005807 A1  Jan. 13, 2011

(30) Foreign Application Priority Data

Mar. 27, 2008  (FR) .................................... 08 01700

(51) Int. Cl.
*H02G 3/06* (2006.01)
(52) U.S. Cl.
USPC .......................................................... 174/93

(58) Field of Classification Search
USPC ......................................... 174/93, 74 R, 75 C
See application file for complete search history.

(56) References Cited

U.S. PATENT DOCUMENTS

| 3,290,064 | A | | 12/1966 | Bush | |
|---|---|---|---|---|---|
| 3,599,757 | A | * | 8/1971 | Takamatsu et al. | ........... 188/371 |
| 3,992,773 | A | * | 11/1976 | Duffner et al. | .................. 29/862 |
| 2007/0191755 | A1 | | 8/2007 | Sellis et al. | |
| 2007/0240896 | A1 | * | 10/2007 | Ott et al. | ......................... 174/93 |

FOREIGN PATENT DOCUMENTS

| EP | 0553618 A1 | 8/1993 |
|---|---|---|
| GB | 1223671 A | 3/1971 |

OTHER PUBLICATIONS

International Search Report, dated Sep. 8, 2009, from corresponding PCT application.

* cited by examiner

*Primary Examiner* — Chau Nguyen
(74) *Attorney, Agent, or Firm* — Young & Thompson

(57) ABSTRACT

A protective device includes a mechanical protective sheath (20) and a thermal protective nozzle (30) mounted at one end (21) of the mechanical protective sheath (20), the mechanical protective sheath (20) including a tubular textile structure that is deformable by compression in the longitudinal direction of the mechanical protective sheath (20), the textile structure having, in a longitudinal compression area, an expanded sheath portion (25) adapted to interact by the reversion of one end (32) of the thermal protective nozzle (30). The device can be used in particular for protecting an element (11) connecting to a sensor (12) of an engine (13).

10 Claims, 2 Drawing Sheets

PROTECTIVE DEVICE, PARTICULARLY FOR CONNECTION ELEMENT

BACKGROUND OF THE INVENTION

1. Field of the Invention

The present invention concerns a thermal and mechanical protection device.

It concerns in particular the protection of a connection cable used in automobile vehicles for the connection of a sensor mounted on an automobile vehicle engine to a cable harness.

2. Description of the Related Art

In this type of application, it is necessary to protect the connection cable not only against mechanical aggression but also against the intense heat generated in the environment of the engine.

In particular, the presence of the exhaust gas evacuation tube (EGR tube) leads to very intense radiation of heat which can lead to a connection cable melting or cause short circuits.

Thus there is known from the document US 2007/0191755 a protection device for a connection cable including a mechanical protection sheath and a thermal protection end-piece mounted at one end of the mechanical protection sheath.

In the above document, the mechanical protection sheath is a convoluted plastic sheath. The thermal protection end-piece is produced from a layer of insulating material and a reflecting layer.

A positioning and fixing device makes it possible to fit the thermal protection end-piece detachably to one end of the mechanical protection sheath.

SUMMARY OF THE INVENTION

An object of the present invention is to propose a thermal and mechanical protection device that is simple to use and in particular facilitates fitting the element protected by the protection device.

To this end, a first aspect of the present invention concerns a protection device including a mechanical protection sheath and a thermal protection end-piece mounted at one end of said mechanical protection sheath.

According to the invention the mechanical protection sheath comprises a tubular textile structure that is deformable by compression in the lengthwise direction of the mechanical protection sheath and said textile structure has in a lengthwise compression area an expanded sheath portion adapted to cooperate with one end of said thermal protection end-piece by being turned back on itself.

Thanks to the textile structure of the mechanical protection sheath that is deformable by compression, it is possible to shorten the length of the protection device in order to leave exposed one end of an element to be connected that is protected by the protection device. There is further obtained the turning back of the expanded sheath portion on itself in the vicinity of the thermal protection end-piece. The turning back of the mechanical protection sheath on itself in the expanded sheath portion makes it possible to create a pleat inside the mechanical protection sheath. This pleat in the sheath is held in shape by the thermal protection end-piece. The position in which the thermal protection end-piece and the turned back expanded sheath portion cooperate makes it possible to move aside the protection device and fit the element to be connected without impediment.

Moreover, this cooperation position being obtained by simple lengthwise compression of the mechanical protection sheath, it is possible to carry out this operation on the protection device several times, in particular in the event of further intervention following the first fix.

In one practical embodiment of the invention, the mechanical protection sheath is deformable between a position of unstable equilibrium in which said expanded sheath portion is turned back on itself and retained by one end of the thermal protection end-piece and a rest position in which said mechanical protection sheath is aligned with said thermal protection end-piece and the mechanical protection sheath is movable from said position of unstable equilibrium to said rest position by elastic return of said mechanical protection sheath to said rest position.

Thanks to the elastic return force acting between the unstable equilibrium position and the rest position of the mechanical protection sheath, it is possible, after fitting, to obtain automatic positioning of the protection device, and in particular secure positioning of the thermal protection end-piece at the end of the mechanical protection sheath, independent of the operator.

In one advantageous embodiment of the invention, the expanded sheath portion is held by turning it back on itself over an exterior surface of said thermal protection end-piece.

Thus the mechanical protection sheath may be retained in a lengthwise compression area by simply turning it back on itself over the thermal protection end-piece, thereby creating a position of unstable equilibrium sufficiently reliable to be maintained while the operator manipulates the element to be connected that is protected by the protection device.

The mechanical protection sheath preferably consists of a tubular braid of monofilaments.

Thanks to this braided structure of the mechanical protection sheath, evacuation of heat from around the protection device is facilitated and in particular it is possible to prevent confinement of heat in the thermal protection end-piece.

Moreover, this braided structure makes it possible to obtain a tubular textile structure that can be expanded in the widthwise direction by compressing it in the lengthwise direction.

A second aspect of the present invention is the use of a protection device of the invention to cover a connection element and in particular a connection element of a sensor mounted on an automobile vehicle engine.

Finally, a third aspect of the present invention aims to protect the use of the protection device of the invention to cover a connection element during fitting of said connection element to another connection element, such use comprising the following steps:

compressing the mechanical protection sheath lengthwise to obtain an expanded sheath portion around said connection element;

turning said expanded sheath portion back on itself by pressing against an end of the thermal protection end-piece;

fitting said connection element to the other connection element; and releasing said expanded sheath portion turned back on itself for elastic return of said mechanical protection sheath to a rest position.

This use of the protection device has features and advantages analogous to those described above with reference to the protection device used.

Other features and advantages of the invention will become more apparent in the course of the following description.

BRIEF DESCRIPTION OF THE DRAWING FIGURES

In the appended drawings, provided by way of non-limiting example:

DETAILED DESCRIPTION OF THE INVENTION

Figure 1:
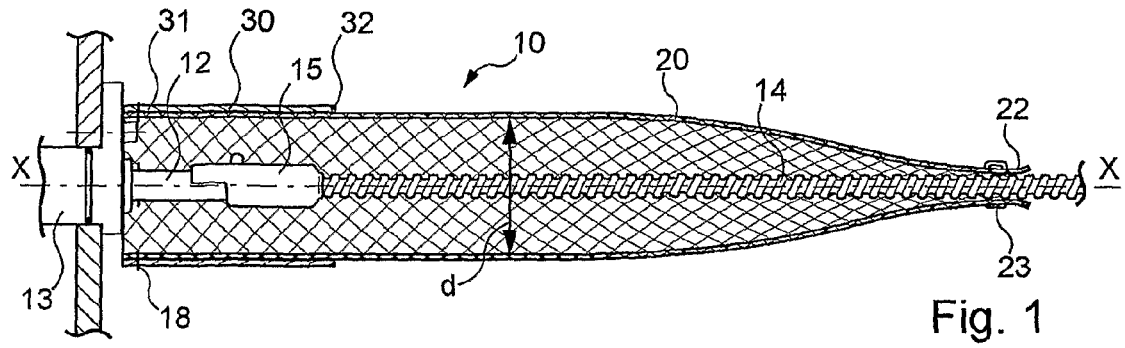
FIG. 1 is a view in lengthwise section of a protection device of a first embodiment of the invention mounted on a connection element.

A protection device of a first embodiment of the invention is described next with reference to FIGS. 1 to 3.

The protection device is illustrated here in an application to motor vehicles.

By way of nonlimiting example, the protection device 10 is mounted on a connection element 11 of a sensor 12 mounted on an engine 13.

The sensor 12 may be a top dead center (TDC) sensor, for example, for detecting the position of an engine cylinder. The sensor 12 may equally be an oxygen sensor for monitoring the operation of the engine 13.

More particularly, the protection device 10 extends in a lengthwise direction X to protect a connection cable 14 connected to a connector 15 adapted to be fitted to the sensor 12.

The elements to be protected are well known in the art and need not be described in more detail here.

The protection device 10 includes a mechanical protection sheath 20 and a thermal protection end-piece 30 mounted at one end 21 of the mechanical protection sheath 20.

Thus in a rest position the mechanical protection sheath 20 extends from a first end 21 to a second end 22 over the total length of the protection device shown in FIG. 1.

As clearly shown in FIG. 1, the first end 21 of this mechanical protection sheath 20 thus covers not only the connection element 11 but also part of the connection of the sensor 12.

At its second end 22, the mechanical protection sheath 20 may be fastened to the connection cable 14 by means of a standard clamping collar.

This fitting at the second end 22 of the mechanical protection sheath 20 thus makes it possible to fasten together the connection element 11 and the protection device 10 before fitting them to the engine.

In this embodiment, the mechanical protection sheath 20 consists of a tubular textile structure produced from braided monofilaments. Here it is a closed tubular sheath obtained directly by tubular braiding.

The monofilaments used to produce the braided sheath are of plastic with a high modulus of elasticity.

For example, these monofilaments may consist of polyester or polyamide. Of course, other materials having enhanced technical characteristics may be used, in particular if the protection device 10 must be used in environments with intense heat radiation.

The length and the diameter of the tubular textile structure are linked to the application and in particular to the dimensions of the connection element 11 to be protected.

Figure 2:
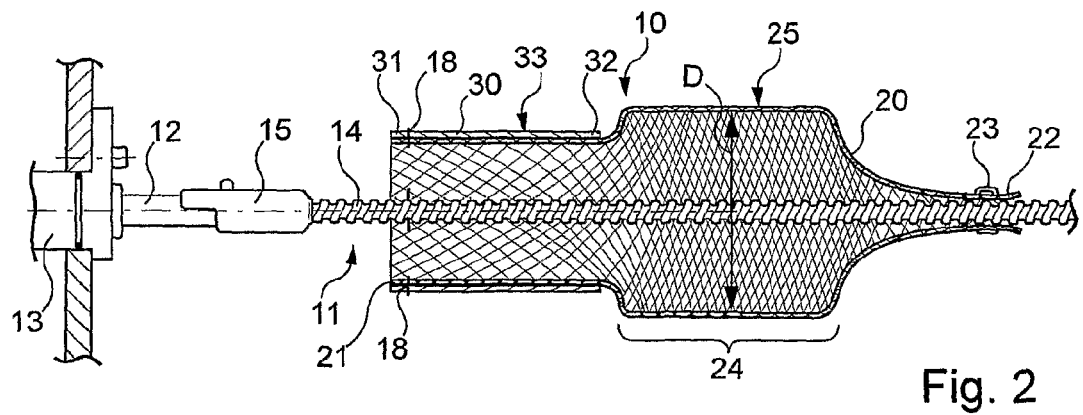
FIG. 2 is a view analogous to FIG. 1 showing compression of the protection device in the lengthwise direction.

This braided tubular textile structure has the feature of being deformable by compression in the lengthwise direction X of the mechanical protection sheath 20 and of forming, as clearly illustrated in FIG. 2, in the area 24 of lengthwise compression, an expanded sheath portion 25.

The dimensions of this expanded sheath portion 25, and in particular its diameter, depend in particular on the braiding angle of the monofilaments of the textile structure and on the number of wicks used to produce the braided structure.

By way of nonlimiting example, the expanded sheath portion 25 may have a diameter D substantially equal to twice the diameter d of the mechanical protection sheath 20 in the rest position.

Although in this embodiment the mechanical protection sheath has a tubular structure, a different shape may be used, in particular a structure flared at one end.

The thermal protection end-piece 30 may be produced from a heat screen formed to cover a portion of the mechanical protection sheath 20 in the vicinity of the first end 21.

By way of nonlimiting example, the thermal protection end-piece may be produced by winding a heat screen into a substantially cylindrical shape and fastening the lengthwise edges together, for example welding or gluing them together.

This heat screen may be produced from a textile coated with a layer of aluminum. For example, a sheet of aluminized polyester may be used.

Of course, the structure of the heat screen is not limiting on the invention. More generally, it may consist of plastic fibers or inorganic fibers, and in particular glass fibers, woven or not, coated with a layer of aluminum.

Figure 3:
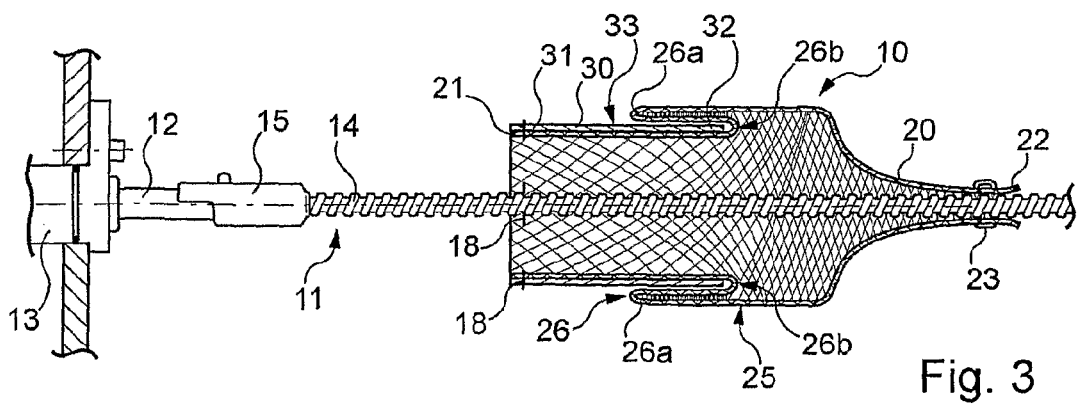
FIG. 3 is a view analogous to FIG. 1 showing the protection device in an unstable equilibrium position.

Likewise, the cylindrical shape shown in FIGS. 1 to 3 is not limiting on the invention, and the thermal protection end-piece may also have a cone shape flared in the direction of the sensor 12 in order to adapt to various protection applications.

Thus the thermal protection end-piece 30 extends in the lengthwise direction X over a portion of the protection device 10 in order to protect in particular the connection (the connection part of the sensor 12 and the connector 15) from thermal aggression from the surrounding environment.

In the application described here, the engine sensors are often subjected to high levels of radiation from the exhaust manifolds or pipes. Thus the thermal protection end-piece 30 must make it possible to protect the connection from an ambient temperature that can reach 150° C., in order to avoid damage to the connector or a short circuit.

By way of nonlimiting example, the length of the thermal protection end-piece 30 in the lengthwise direction X may be between 2 and 10 cm inclusive and for example between 3 and 6 cm inclusive.

The total length of the protection device may be between 15 and 20 cm inclusive.

The thermal protection end-piece 30 is preferably mounted at the end 21 of the mechanical protection sheath 20 at a first end 31 of the thermal protection end-piece.

The fixing means used may consist, for example, of one or more clips 18 for fastening the ends 21, 31 of the mechanical protection sheath 20 and the thermal protection end-piece 30.

Of course, any other fixing technique may be used here and in particular gluing or welding.

On the other hand, the mechanical protection sheath 20 extends freely inside the thermal protection end-piece 30 and extends out of the thermal protection end-piece 30 beyond its second end 32.

In this embodiment, as shown in FIG. 1, the diameter d of the mechanical protection sheath 20 substantially corresponds to the inside diameter of the thermal protection sheath 30. Of course, the diameter d of the mechanical protection sheath 20 could be smaller, the end 21 of the mechanical protection sheath 20 then being slightly deformed into a cone shape to enable the fixing of the ends 21, 31 of the mechanical protection sheath 20 and the thermal protection end-piece 30.

It will be noted that the breathable structure of the braided mechanical protection sheath facilitates the circulation of air and in particular the evacuation of heat from around the thermal protection end-piece 30 toward the opposite end 22 of the mechanical protection sheath 20.

As clearly shown in FIGS. 2 and 3, on lengthwise compression of the mechanical protection sheath 20, the expanded sheath portion 25 makes it possible to initiate turning the mechanical protection sheath 20 back on itself in this area, in cooperation with the end 32 of the thermal protection end piece 30.

Here the diameter D of the expanded sheath portion 25 is greater than the external dimensions of the thermal protection end-piece 30, here its diameter.

Accordingly, in this embodiment, the expanded sheath portion 25 is retained by turning it back over an exterior surface 33 of the thermal protection end piece 30, as shown in FIG. 3.

More specifically, the expanded sheath portion 25 forms a re-entrant annular ring-shaped pleat 26 inside the mechanical protection sheath 20. In this embodiment the pleat 26 extends over a corresponding part of the surface 33 in the vicinity of the end 32 of the thermal protection end-piece 30.

The pleat 26 is thus formed of a re-entrant sheath portion inside the expanded sheath portion 25 between an external end 26a of the expanded sheath portion 25 and an internal end 26b connected to the portion of the mechanical protection sheath 20 inside the thermal protection end-piece 30.

When the mechanical protection sheath 20 goes to the position shown in FIG. 3, the second end 32 of the thermal protection end-piece 30 constitutes a bearing area for turning the expanded sheath portion 25 back on itself over the second end 32 of the thermal protection sheath 30.

Thanks to the elastic structure of the braid, the pleat 26 in the expanded sheath portion 25 turned back on itself retains the end 32 of the thermal protection end-piece 30 pinched between the pleat 26 and the mechanical protection sheath portion 20 inside the thermal protection end-piece 30.

It will be noted that the force exerted by the expanded sheath portion turned back on itself may cause slight deformation and tightening of the end 32 of the thermal protection end-piece 30.

Thus an unstable equilibrium position is reached in which the mechanical protection sheath 20 has a shorter length in the lengthwise direction X, is retained by the expanded sheath portion, and is turned back on itself over the thermal protection end-piece 30. As clearly shown in FIG. 3, this shortened length of the protection device 10 makes it possible to leave the end of the connection element 11 free and thus to facilitate intervention on the sensor 12 and the connector 15.

The mechanical protection sheath 20 is moreover movable from this unstable equilibrium position to the rest position shown in FIG. 1 by an elastic return force exerted by the textile structure itself.

Thus as soon as the expanded sheath portion 25 is displaced slightly from its unstable equilibrium position, the mechanical protection sheath 20 tends to return to its rest position shown in FIG. 1.

This effect of returning to the rest position, known as the "push-back effect", makes it possible to obtain reliable positioning of the thermal protection end-piece 30 over the elements to be protected from heat, i.e. here the sensor 12 and the connector 15, as shown in FIG. 1.

Thus fitting the protection device is facilitated and precisely locating the thermal protection end-piece 30 does not depend on manipulations performed by the operator.

In practice, the protection device described above may be used for the first fixing of a sensor 12 and its connection element 11 on an automobile vehicle engine 13.

To effect this fixing, the mechanical protection sheath 20 is compressed lengthwise in order to obtain an expanded sheath portion 25 around the connection element 11.

The expanded sheath portion 25 is then turned back on itself by pressing it against the end 32 of the thermal protection end-piece 30 so that it is retained in the unstable equilibrium position shown in FIG. 3.

In this shortened configuration of the protection device 10, it is possible to fit the connector 15 without impediment to a connection element, here the sensor 12.

Once the connection manipulations have been carried out, the expanded sheath portion 25 turned back on itself may be released so that the mechanical protection sheath 20 is returned by the elastic return force to the rest position shown in FIG. 1. Thus the protection device 10 resumes its initial length and the thermal protection end-piece 30 automatically comes to occupy a dedicated position over the connector 15 in order to protect this sensitive part of the connection element 11 against thermal attack.

Of course, the present invention is not limited to the embodiment described above.

Figure 4:
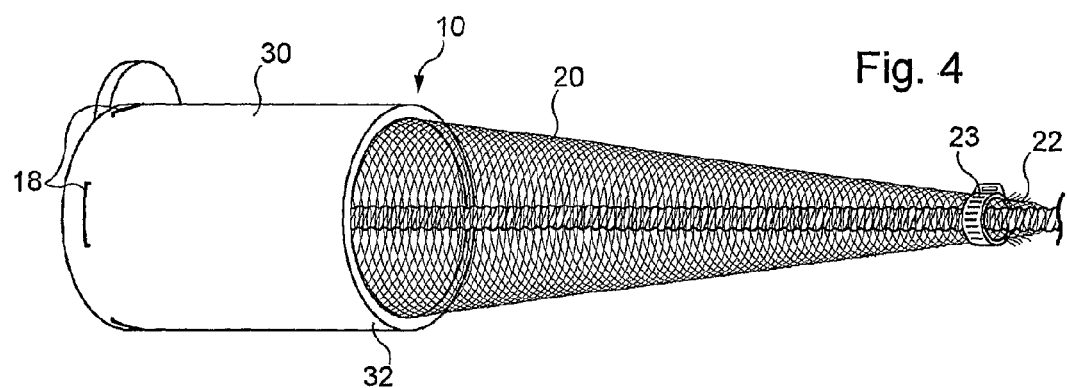
FIG. 4 is a perspective view of a protection device of a second embodiment of the invention mounted on a connection element.
Figure 5:
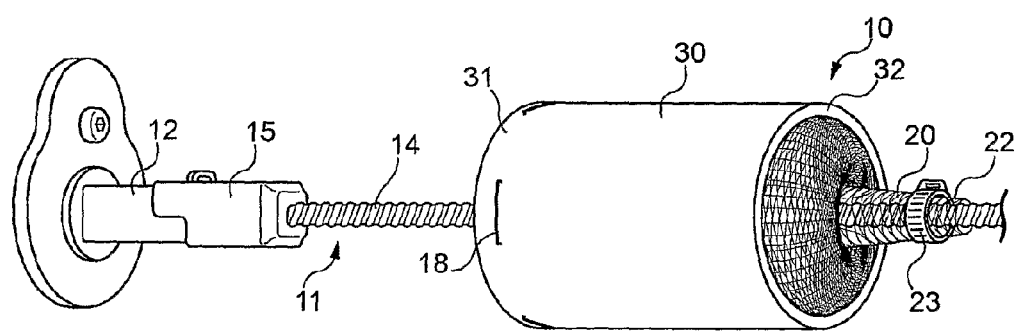
FIG. 5 is a view analogous to FIG. 4 showing the protection device in an unstable equilibrium position.
Figure 6:
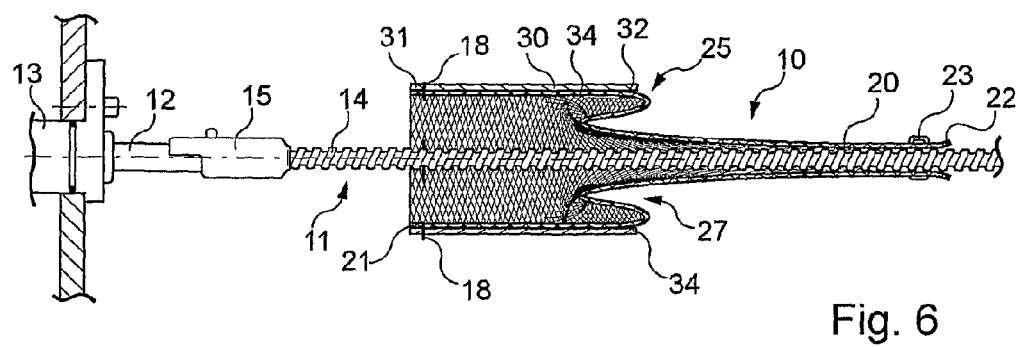
FIG. 6 is a view in lengthwise section showing the protection device in the FIG. 5 unstable equilibrium position.

In particular, FIGS. 4 to 6 show a different embodiment in which the expanded sheath portion 25 is also adapted to cooperate by being turned back on itself at an end 32 of the thermal protection end-piece, but here inside the thermal protection end-piece.

Elements common to the previous embodiment bear the same reference numbers and do not need to be described again in detail.

As clearly shown in FIGS. 5 and 6, here the expanded sheath portion 25 is adapted to form a pleat 27 inside the thermal protection end-piece 30. Accordingly, in this second embodiment, the mechanical protection sheath 20 is retained in an unstable equilibrium position by an interior surface 34 of the thermal protection end-piece 30 near its second end 32 keeping the pleat 27 compressed.

Moreover, the textile structure of the mechanical protection sheath could be different, and in particular could be produced by a tubular knitting process.

The invention claimed is:

1. A protection device comprising:
a mechanical protection sheath (20); and
a thermal protection end-piece (30) mounted at one end (21) of the mechanical protection sheath (20), said mechanical protection sheath (20) comprising a tubular textile structure that is deformable by compression in a lengthwise direction (X) of the mechanical protection sheath (20) and said textile structure having in a lengthwise compression area (24) an expanded sheath portion (25) adapted to cooperate with one end (32) of the thermal protection end-piece (30) by being turned back on the expanded sheath portion, wherein
said mechanical protection sheath (20) is deformable between a position of unstable equilibrium in which said expanded sheath portion (25) is turned back on the expanded sheath portion and retained by one end (32) of the thermal protection end-piece (30), and a rest position in which said mechanical protection sheath (20) is aligned with said thermal protection end-piece (30) and the mechanical protection sheath (20) is movable from said position of unstable equilibrium to said rest position by elastic return of said mechanical protection sheath (20) to said rest position.

2. The protection device according to claim 1, wherein said expanded sheath portion (25) is retained by turning it back on the expanded sheath portion over an exterior surface (33) of said thermal protection end-piece (30).

3. The protection device according to claim 2, wherein a diameter (D) of said expanded sheath portion (25) is greater than the external dimensions of said thermal protection end-piece (30).

4. The protection device according to claim 1, wherein said mechanical protection sheath (20) consists of a tubular braid of monofilaments.

5. The protection device according to claim 1, wherein the thermal protection end-piece (30) has a substantially cylindrical shape, the mechanical protection sleeve (20) lies inside said thermal protection end-piece (30), and the ends (21, 31) of said mechanical protection sheath (20) and said thermal protection end-piece (30) are fixed to each other.

6. The protection device according to claim 5, wherein said thermal protection end-piece (30) has a second end (32) opposite a first end (31) fixed to said mechanical protection sheath (20) and said second end (32) constitutes a bearing area for the turning back on itself of said expanded sheath portion (25) over said second end (32) of said thermal protection end-piece (30).

7. A method of using a protection device according to claim 1, comprising:
 covering a connection element (11).

8. The protection device according to claim 1, wherein said expanded sheath portion (25) is retained by turning it back on itself over an exterior surface (33) of said thermal protection end-piece (30).

9. A method of using a protection device according to claim 1, comprising:
 covering a connection element (11) of a sensor (12) mounted on an automobile vehicle engine (13).

10. A method of covering a connection element (11) during fitting of said connection element (11) to another connection element (12), which comprises the following steps:
 providing a protection device comprising a mechanical protection sheath (20) and a thermal protection end-piece (30) mounted at one end (21) of the mechanical protection sheath (20), said mechanical protection sheath (20) comprising a tubular textile structure that is deformable by compression in a lengthwise direction (X) of the mechanical protection sheath (20) and said textile structure having in a lengthwise compression area (24) an expanded sheath portion (25) adapted to cooperate with one end (32) of the thermal protection end-piece (30) by being turned back on the expanded sheath portion;
 compressing the mechanical protection sheath (20) lengthwise to obtain an expanded sheath portion (25) around said connection element (11);
 turning said expanded sheath portion (25) back on itself by pressing against an end (32) of said thermal protection end-piece (30);
 fitting said connection element (11) to the other connection element (12); and
 releasing said expanded sheath portion (25) turned back on itself for elastic return of said mechanical protection sheath (20) to a rest position.

* * * * *